(12) United States Patent
Yun et al.

(10) Patent No.: US 9,573,479 B2
(45) Date of Patent: Feb. 21, 2017

(54) BATTERY EXCHANGE STATION AND METHOD OF OPERATING BATTERY EXCHANGE STATION

(71) Applicant: DOOSAN HEAVY INDUSTRIES & CONSTRUCTION CO., LTD., Changwon-si, Gyeongsangnam-do (KR)

(72) Inventors: Choa Mun Yun, Daejon (KR); Sung Hoon Kim, Anyang-si (KR); Tae Hee Kim, Daejon (KR); Won Joon Choi, Daejon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 226 days.

(21) Appl. No.: 14/582,291

(22) Filed: Dec. 24, 2014

(65) Prior Publication Data

US 2015/0183332 A1    Jul. 2, 2015

(30) Foreign Application Priority Data

Dec. 27, 2013  (KR) .......................... 10-2013-0165948

(51) Int. Cl.
*H02J 7/00* (2006.01)
*B60L 11/18* (2006.01)
*B60L 11/00* (2006.01)
*H02J 3/32* (2006.01)

(52) U.S. Cl.
CPC .......... *B60L 11/1822* (2013.01); *B60L 11/007* (2013.01); *B60L 11/184* (2013.01);
(Continued)

(58) Field of Classification Search
CPC ...................................................... Y02T 90/14
(Continued)

(56) References Cited

U.S. PATENT DOCUMENTS 5,548,200 A * 8/1996 Nor ........................ B60L 11/184
320/106
6,680,547 B1 * 1/2004 Dailey ....................... H02J 3/28
307/24

(Continued)

FOREIGN PATENT DOCUMENTS

| CN | 102832662 A | 12/2012 |
| CN | 103248064 A | 8/2013 |
| KR | 20110112044 A | 10/2011 |
| KR | 20110129517 A | 12/2011 |

OTHER PUBLICATIONS

Lombardi P. et al, "Battery Switch Station as storage system in an autonomous power system: optimization issue", Jul. 25-29, 2010, pp. 1-6.
European Patent Office Communication in corresponding Foreign Patent Application No. 14199530.8 dated Oct. 8, 2015.

*Primary Examiner* — Yalkew Fantu
(74) *Attorney, Agent, or Firm* — Sughrue Mion, PLLC

(57) ABSTRACT

A battery exchange station and a method of operating the battery exchange station are provided which can solve conventional problems, such as the unavailability of electricity stored in a battery, the difficulties in coping with changes in system operation, and the difficulties in utilizing renewable energy. The battery exchange station and the method of operating the battery exchange station allow for utilization of electricity stored in a battery and improve a system's operation and electricity demand conditions by charging a large-capacity battery with electricity coming from the system and providing the electricity stored in the large-capacity battery to the system.

18 Claims, 5 Drawing Sheets

(52) U.S. Cl.
CPC ....... *B60L 11/1842* (2013.01); *B60L 11/1844* (2013.01); *H02J 7/007* (2013.01); *B60L 2200/12* (2013.01); *B60L 2230/22* (2013.01); *B60L 2230/24* (2013.01); *B60L 2230/26* (2013.01); *B60L 2230/28* (2013.01); *B60L 2230/30* (2013.01); *H02J 3/32* (2013.01); *H02J 7/0013* (2013.01); *Y02E 60/721* (2013.01); *Y02T 10/7005* (2013.01); *Y02T 10/7094* (2013.01); *Y02T 90/121* (2013.01); *Y02T 90/124* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
USPC ........................................................ 320/109
See application file for complete search history.

(56) References Cited

U.S. PATENT DOCUMENTS

| | | | |
|---|---|---|---|
| 6,766,874 B2* | 7/2004 | Naito | B60K 6/485 180/65.26 |
| 7,256,516 B2* | 8/2007 | Buchanan | B60L 11/1811 307/62 |
| 2011/0001356 A1* | 1/2011 | Pollack | B60L 11/1842 307/31 |
| 2012/0041855 A1* | 2/2012 | Sterling | B60L 3/0046 705/34 |
| 2012/0299531 A1 | 11/2012 | Prosser et al. | |
| 2013/0169226 A1* | 7/2013 | Read | B60L 11/16 320/109 |

* cited by examiner

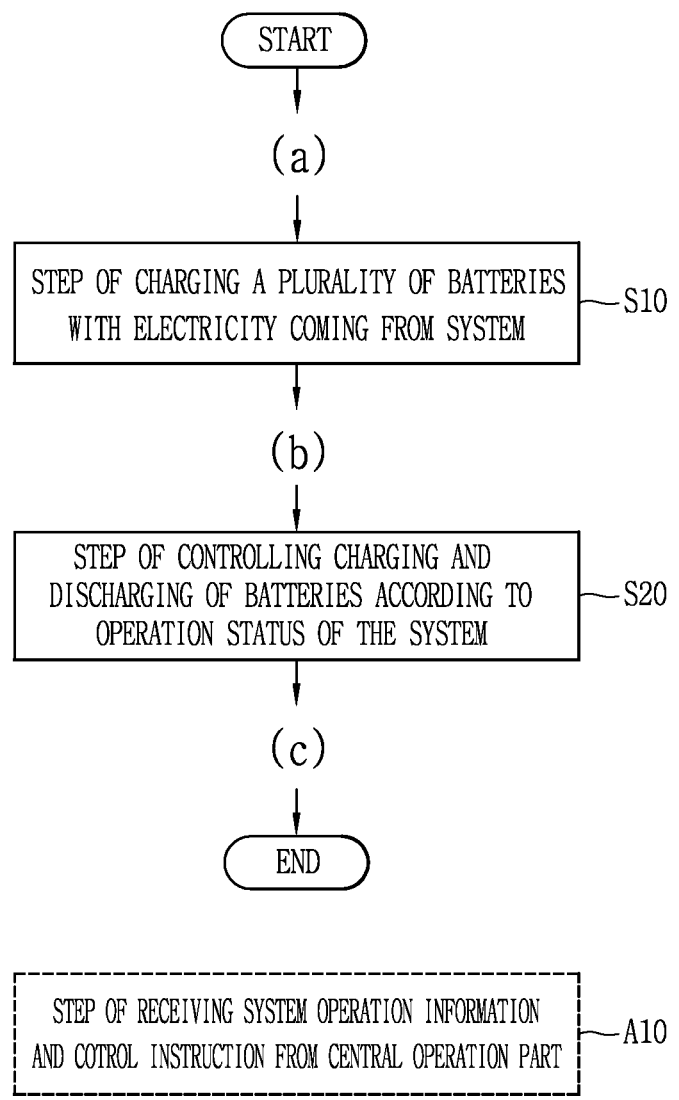

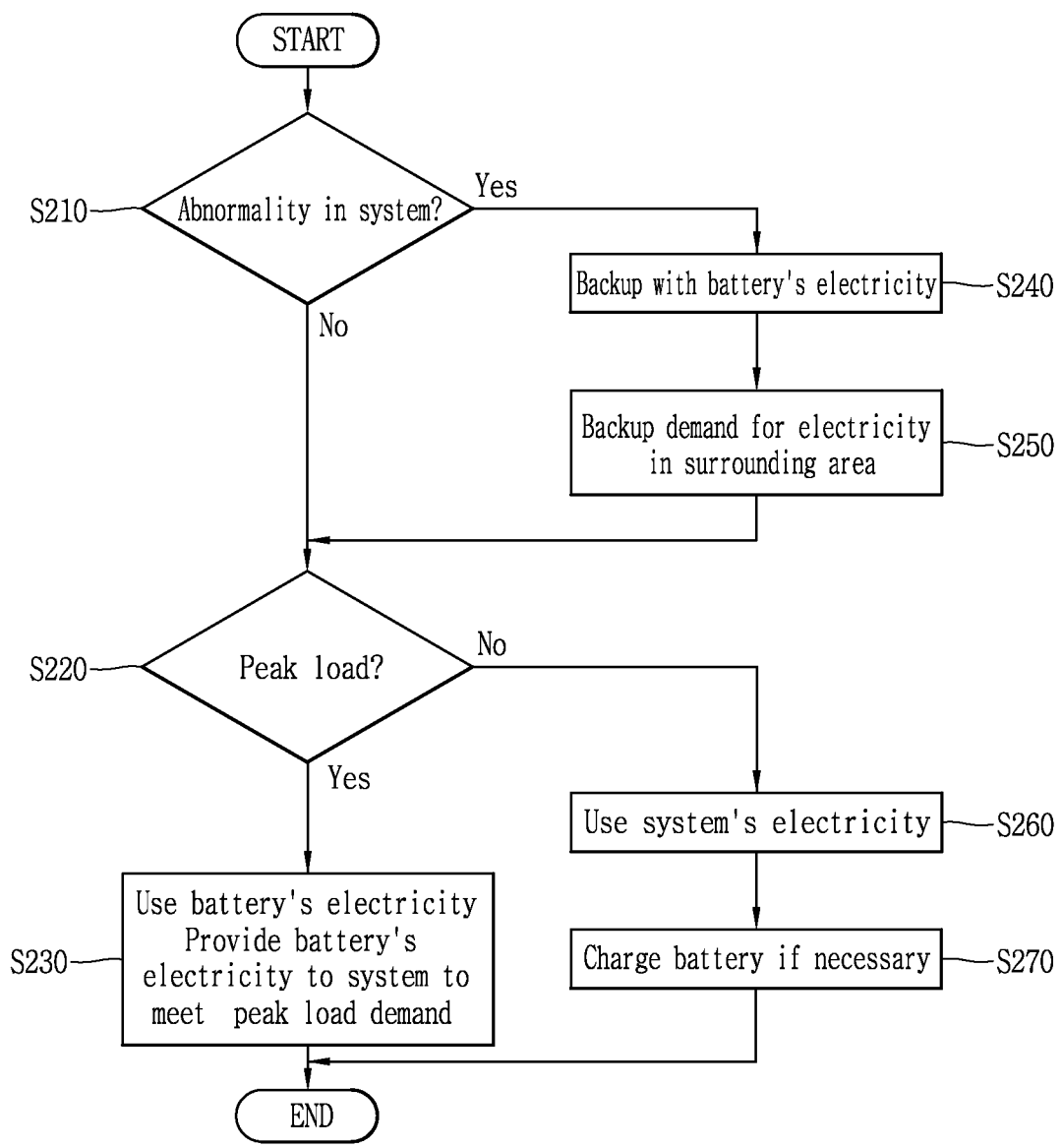

BATTERY EXCHANGE STATION AND METHOD OF OPERATING BATTERY EXCHANGE STATION

CROSS-REFERENCE TO RELATED APPLICATION

Pursuant to 35 U.S.C. §119(a), this application claims the benefit of earlier filing date and right of priority to Korean Application No. 10-2013-0165948, filed on Dec. 27, 2013, the contents of which is incorporated by reference herein in its entirety.

FIELD OF THE INVENTION

Exemplary embodiments of the invention relate to a battery exchange station and a method of operating the battery exchange station, and more particularly, to a battery exchange station which serves as electric power storage by charging a large-capacity battery with electricity coming from a system and providing the electricity stored in the large-capacity battery according to the operation status of the system, and a method of operating the battery exchange station.

BACKGROUND OF THE INVENTION

FIG. 1 is a diagram showing a related art configuration.

As shown in FIG. 1, conventionally, electricity generated from fossil fuel and renewable energy sources of a system is provided to a load and a battery exchange station. The electricity is unidirectionally transmitted from the system to customers.

The battery exchange station is a place where the battery of an electric car can be swapped. The battery exchange station is equipped with multiple batteries that can replace the batteries of electric cars, and the batteries are charged with electricity coming from the system. The batteries equipped in the exchange station are batteries for electric cars, and cannot therefore store large amounts of electricity.

Renewable energy generation such as fuel cell power generation, wind power generation, and solar power generation has been deployed in the system to provide generated electricity to the system. However, renewable energy generation such as wind and solar power generation is highly affected by the weather, which makes it difficult to secure a steady and continued supply of electricity to a load, resulting in low utilization. Especially, fuel cell power generation, for example, is rendered unavailable if the battery exchange station is disconnected from the system or load due to an abnormality in the system or load, because fuel cell generation is available when the battery exchange station is connected to the load.

These limitations lead to limitations in the operations of the system and battery exchange station. Since the system and the battery exchange station are configured to provide electricity unidirectionally, excess electricity, if any, in the batteries equipped in the battery exchange station cannot be transmitted to the system, thus making the excess electricity unavailable. In particular, even in case of emergency such as peak time, blackout, etc which require power supply to the system, any excess electricity in the batteries cannot be provided to the system because electricity is transmitted unidirectionally.

Moreover, the batteries equipped in the battery exchange station cannot store a large amount of electricity, and therefore excess electricity in the batteries alone does not ensure the proper supply of electricity in case the power supply to the system is needed.

As a smart grid replaces the existing electric power networks, known as uninterruptible power supply (UPS) to a load, charging of electric cars and electric car batteries, bidirectional transactions of excess electricity or surplus electricity between suppliers and consumers, and renewable energy generation are in the spotlight. In line with this, there is a need to overcome the above-mentioned problems in order to improve operations between a system and a battery exchange station and achieve a variety of functions and benefits of the smart grid.

SUMMARY OF THE INVENTION

It is, therefore, an aspect of the present invention to provide a battery exchange station which can solve the problems occurring in the prior art, such as the unavailability of electricity stored in a battery, the difficulties in coping with changes in system operation, and the difficulties in utilizing renewable energy, and a method of operating the battery exchange system.

According to an embodiment of the present invention, there is provided a battery exchange station including: a plurality of batteries including a large-capacity battery used only for electric power storage and a replacement battery that is interchangeable with the battery of a means of transportation; and a controller that controls charging and discharging of the batteries so that the batteries are charged with electricity coming from a system and the electricity stored the batteries is provided to the system according to the operation status of the system.

The batteries may be rechargeable batteries that can be charged and discharged.

The large-capacity battery may be any one of a Redox flow battery, a NaS (sodium-sulfur) battery, and a compressed air energy storage (CAES) system.

The battery of the means of transportation may be charged with electricity coming from the system when swapped for the replacement battery.

The battery of the means of transportation may be charged by receiving the electricity stored in the batteries.

The battery of the means of transportation may be charged with electricity coming from the system, and the electricity stored in the battery of the means of transportation may be provided to the batteries and the system.

The station may further include an electric power converter that converts the electricity stored in the batteries and the electricity released from the batteries.

The electric power converter may include: a converter that converts AC power to DC power; an inverter that converts DC power to AC power; and a transformer that changes voltages from one voltage level to another.

In an embodiment, the operation status of the system may be variable according to a load power of the system, a usage period of a load power of the system, and whether the system has supplied or received electricity.

After determining the operation status of the system, the controller may allow the electricity stored in the batteries to be provided to the system if the load power of the system is above a preset reference level, and allow the electricity coming from the system to be stored in the batteries if the load power of the system is equal to or below the preset reference level, wherein the preset reference level may vary with the possible supply of electricity from the system.

After determining the operation status of the system, the controller may allow the electricity stored in the batteries to be provided to the system if the system is at peak time during which the load power consumption of the system is at its peak, and allow the electricity coming from the system to be provided to the batteries if the system is at off-peak time, wherein the peak time may be set by dividing the time spent by the system on consuming the load power into several periods and specifying a period during which the load power consumption of the system is at its peak.

After determining the operation status of the system, if the electricity supply through the system is interrupted, the controller may allow the electricity stored in the batteries to be provided to the system.

After determining the operation status of the system, if the electricity supply in the system requires a long-term electricity supply or heavy-duty electricity supply, the controller may allow the electricity stored in the batteries to be provided to the system, and if the electricity supply in the system requires a short-term electricity supply or light-duty electricity supply, the controller may allow the electricity stored in the replacement battery to be provided to the system.

At least either the system or the station may include a renewable energy source including at least a fuel-cell generator.

The renewable energy source may be an electrical production source including at least either a wind power generator or a solar power generator.

The fuel cell generator may provide generated electricity to the load on the system, and after determining the operation status of the system, if the electricity supply through the system is interrupted, the controller may connect the fuel-cell generator to the batteries to provide the electricity generated by the fuel-cell generator to the batteries.

The system may include a central operation part that controls the provision and reception of electricity to and from the system and conducts communication with the controller, and the controller may control charging and discharging of the batteries based on system operation information and a control instruction received from the central operation part.

The central operation part may monitor the operation status of the system in real time and communicate with the controller in real time.

The system operation information may be information about the provision and reception of electricity to and from the system that is collected by the central operation part, and the control instruction may be a control instruction regarding the reception or provision of electricity from or to the system.

According to another embodiment of the present invention, there is provided a method of operating a battery exchange station, the method including the steps of: charging a plurality of batteries with electricity coming from a system; and controlling charging and discharging of the batteries according to the operation status of the system that depends on the load power of the system or the provision or reception of electricity to or from the system.

The batteries may be rechargeable batteries that can be charged and discharged, and include: a large-capacity battery used only for electric power storage; and a replacement battery that is interchangeable with the battery of a means of transportation.

The battery of the means of transportation may be swappable for the replacement battery and charged with electricity coming from the system when swapped for the replacement battery.

The battery of the means of transportation may be charged by receiving the electricity stored in the large-capacity battery and the replacement battery.

In the step of controlling charging and discharging of the batteries, after the operation status of the system is determined, the electricity stored in the batteries may be provided to the system if the load power of the system is above a preset reference level, and the electricity coming from the system may be stored in the batteries if the load power of the system is equal to or below the preset reference level, wherein the preset reference level may vary with the possible supply of electricity from the system.

In the step of controlling charging and discharging of the batteries, after the operation status of the system is determined, the electricity stored in the batteries may be provided to the system if the system is at peak time during which the load power consumption of the system is at its peak, and the electricity coming from the system may be provided to the batteries if the system is at off-peak time, wherein the peak time may be set by dividing the time spent by the system on consuming the load power into several periods and specifying a period during which the load power consumption of the system is at its peak.

In the step of controlling charging and discharging of the batteries, after the operation status of the system is determined, if the electricity supply through the system is interrupted, the electricity stored in the batteries may be provided to the system.

At least either the system or the station may include a renewable energy source including at least a fuel-cell generator.

The fuel-cell generator may provide generated electricity to the load on the system, and the renewable energy source may be an electrical production source including at least either a wind power generator or a solar power generator.

In the step of controlling charging and discharging of the batteries, after the operation status of the system is determined, if the electricity supply through the system is interrupted, the fuel-cell generator may be connected to the batteries to provide the electricity generated by the fuel-cell generator to the batteries.

The method of operating a battery exchange station may further include the step of controlling the provision and reception of electricity to and from the system and receiving system operation information and a control instruction from a central operation part that conducts communication with the station.

In the step of controlling charging and discharging of the batteries, charging and discharging of the batteries may be controlled based on the received system operation information and control instruction.

The central operation part may monitor the operation status of the system in real time and communicate with the station in real time.

The system operation information may be information about the provision and reception of electricity to and from the system that is collected by the central operation part, and the control instruction may be a control instruction regarding the reception or provision of electricity from or to the system.

The battery exchange station and method of operating the battery exchange station disclosed in this specification allow for utilization of electricity stored in a battery by charging electricity to the battery and delivering it back to a system.

The battery exchange station and method of operating the battery exchange station disclosed in this specification improve a system's operation and electricity demand conditions by providing the electricity stored in the battery to the system in case of any changes in the system's operation.

The battery exchange station and method of operating the battery exchange station disclosed in this specification enable the bidirectional supply of electricity between the station and a connected device or system by enabling electricity exchange among a system that provides electricity using a battery storing it, a means of transportation that is charged with electricity, and the station.

The battery exchange station and method of operating the battery exchange station disclosed in this specification make efficient use of excess electricity stored in the means of transportation charged with electricity by exchanging electricity between the means of transportation and the station.

The battery exchange station and method of operating the battery exchange station disclosed in this specification allow for bidirectional electricity transactions between suppliers and consumers by enabling the bidirectional supply of electricity between the station and a connected device or system.

The battery exchange station and method of operating the battery exchange station disclosed in this specification allow for a stable and flexible operation of the system by charging a battery with excess electricity, if there is any in the system, and providing the electricity stored in the battery to the system if there is no excess electricity.

The battery exchange station and method of operating the battery exchange station disclosed in this specification make efficient, effective, and flexible use of electricity generated by the system by charging a battery with excess electricity, if there is any in the system, and providing the electricity stored in the battery to the system if there is no excess electricity.

The battery exchange station and method of operating the battery exchange station disclosed in this specification enable uninterrupted power supply to a load by providing the electricity stored in the battery to the load on the system in case of an abnormality.

The battery exchange station and method of operating the battery exchange station disclosed in this specification keep renewable energy generation available by charging the battery with electricity generated by a renewable energy source in case of an abnormality.

The battery exchange station and method of operating the battery exchange station disclosed in this specification promote the utilization of renewable energy sources by storing electricity coming from a renewable energy source in the battery and providing it to the system and the load or charging the means of transportation with it.

BRIEF DESCRIPTION OF THE DRAWINGS

The above and other objects and features of the present invention will become apparent from the following description of preferred embodiments given in conjunction with the accompanying drawings, in which:

FIG. 5 is a sequence diagram showing the steps of a method of operating a battery exchange station disclosed in this specification; and FIG. 6 is a flowchart showing the flow of the method of operating a battery exchange station disclosed in this specification.

DETAILED DESCRIPTION OF THE EMBODIMENTS

Figure 1:
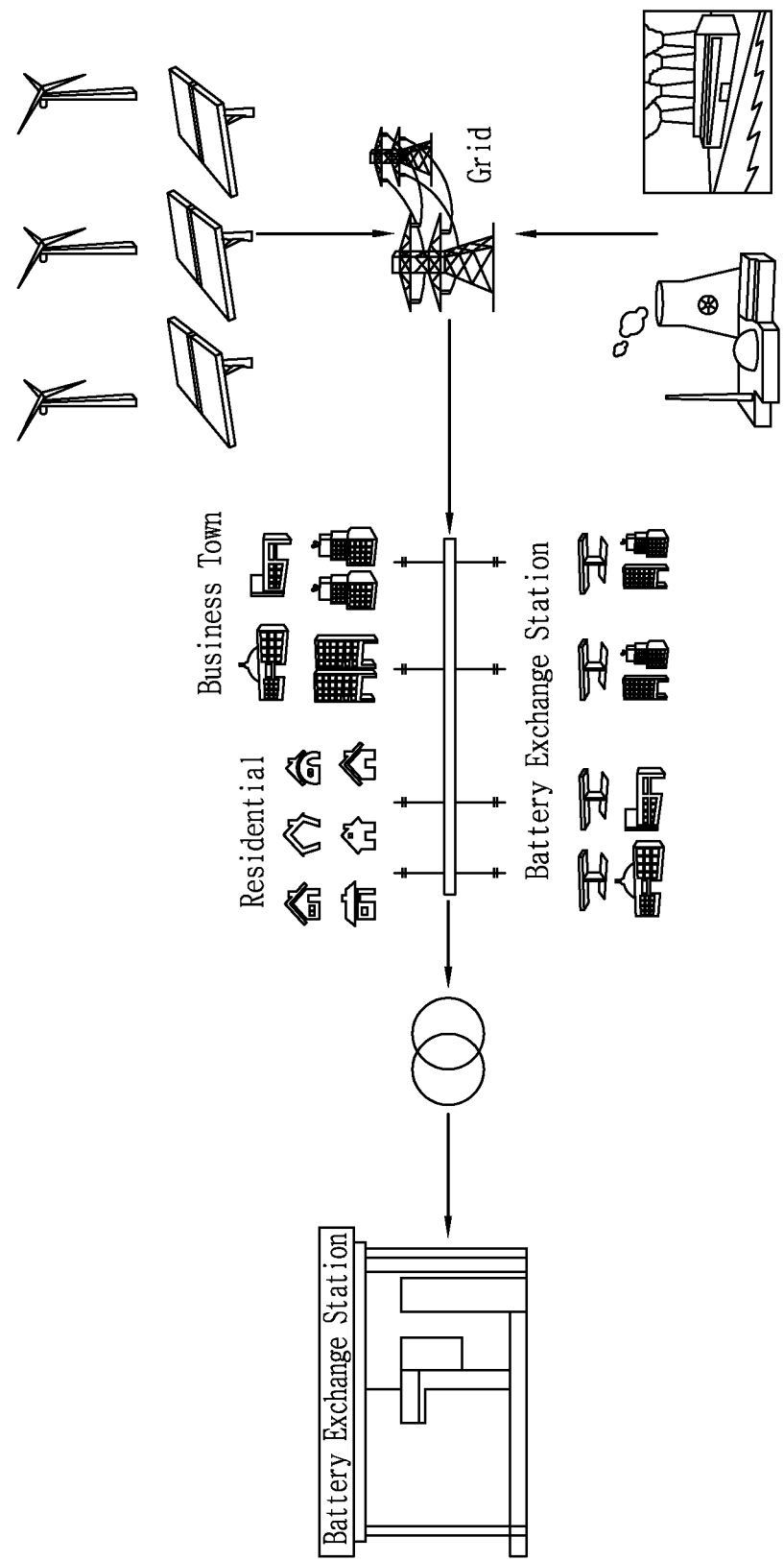
FIG. 1 is a diagram showing a prior art configuration.

The technology disclosed in this specification is applicable to a battery exchange station and a method of operating the battery exchange station. However, the technology disclosed in this specification is not limited thereto but applicable to all kinds of electric power storage and charging systems, including all battery exchanging systems, all methods of operating battery exchanging systems, all battery charging stations, all charging systems for battery charging stations, all methods of operating charging systems for battery charging stations, all electric power storage sites, all electric power storage systems, and all methods of operating electric power storage systems.

The technical terms used in this specification are merely used to describe specific embodiments of the present invention. Therefore, it should be understood that the terms used herein are not intended to limit the present invention. Additionally, unless defined otherwise, the technical terms used in this specification should be interpreted by the meaning and significance generally known to and understood by anyone skilled in the art and, therefore, should not be interpreted as an excessively broad and inclusive meaning nor interpreted as an excessively narrow meaning. Moreover, in case any of the technical terms used in the specification of the present invention corresponds to an incorrect term that is incapable of correctly express the scope and spirit of the present invention, the corresponding term should be replaced by a correct technical term that can be correctly understood by anyone skilled in the art. Furthermore, the general terms used in the specification of the present invention should be understood by its literal meaning defined in a dictionary, or should be interpreted based upon the overall context of a phrase, sentence, or paragraph of the specification. And, therefore, such general terms should not be understood or interpreted by excessively narrow meanings.

Additionally, it is to be understood that, unless obviously and clearly noted or specified otherwise within the specification, singular forms of the terms used herein may include plural forms of the corresponding terms. In the application of the present invention, the terms "consist(s) of" or "include(s) (or comprise(s))" should not be interpreted or understood as including, without exception, all of the plurality of elements (or components) or the plurality of steps disclosed in the description of the present invention. In other words, it should be understood that some (or part) of the elements (or components) or some (or part) of the steps may not be included, or that additional elements (or components) or steps may be further included in the present invention.

Hereinafter, the preferred embodiments of the present invention will be described in detail with reference to the accompanying drawings. However, regardless of the reference numerals within the drawings, the same reference numerals will be given to like or same part of the present invention, and detailed description of the same parts will be omitted for simplicity.

Also, in describing the present invention, if it is determined that detailed description of a disclosed technology may cause ambiguity in describing the principle of the present invention, the detailed description of the same will also be omitted for simplicity. Furthermore, it will be apparent that the appended drawings are merely provided to facilitate the understanding of the scope and spirit of the present invention, and that the appended drawings are not provided to limit the scope and spirit of the present invention.

Hereinafter, a battery exchange station and a method of operating the battery exchange station disclosed in this specification will be described. For convenience of explanation and easier understanding of an embodiment, the description will be given in two sections: 'battery exchange station'; and 'method of operating battery exchange station', and a battery exchange station and a method of operating the battery exchange station according to the embodiment will be described in this order.

[Battery Exchange Station]

A battery exchange station disclosed in this specification may be implemented by a portion or combination of the components or steps included in a method of operating the battery exchange station according to this embodiment or other embodiments to be described below or by a combination of the embodiments. The technical terms used in this specification are merely used to describe specific embodiments of the present invention. Therefore, it should be understood that the terms used herein are not intended to limit the present invention.

Hereinafter, a battery exchange station (hereinafter, station) disclosed in this specification will be described with reference to FIGS. 2 to 4.

Figure 2:
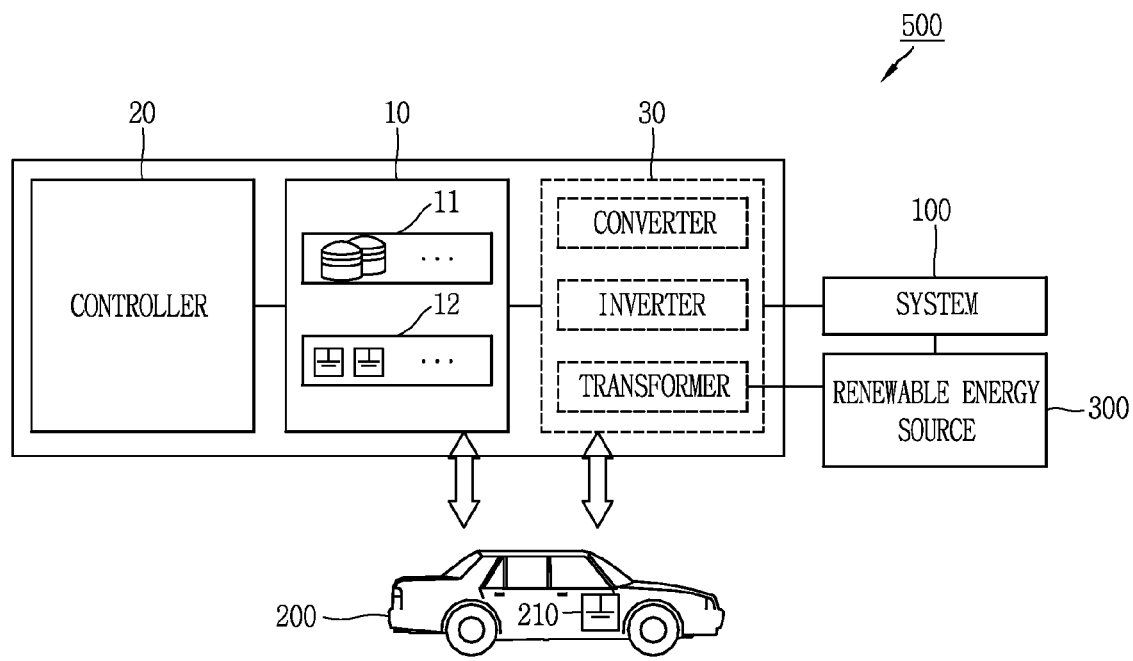
FIG. 2 is a diagram showing the configuration of a battery exchange station disclosed in this specification.

As shown in FIG. 2, a station 500, where the battery 210 of a means of transportation 200 is swapped, includes a plurality of batteries 10 including a large-capacity battery 11 used only for electric power storage and a replacement battery 12 that is interchangeable with the battery 210 of a means of transportation 200, and a controller 20 that controls charging and discharging of the batteries 10 so that the batteries 10 are charged with electricity coming from a system 100 and the electricity stored in the batteries 10 is provided to the system 100 according to the operation status of the system 100.

The means of transportation 200 may be powered by electric energy.

The means of transportation 200 may be an electric car, an electric bicycle, or an electric motorbike, for example.

The means of transportation 200 may use the electricity stored in the battery 210.

The battery 210 of the means of transportation 200 may be swapped at the station 500.

The system 100 may provide electricity to the station 500.

Figure 3:
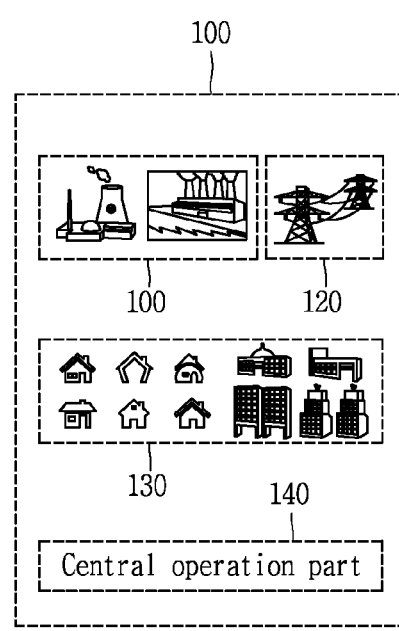
FIG. 3 illustrates the configuration of an embodiment of the battery exchange station disclosed in this specification.

As shown in FIG. 3, the system 100 may refer to an electric power system including a plurality of electrical production sources 110, electric transmission, substation, and distribution equipment 120, and multiple loads 130.

The system 100 may be an electric power system that provides electricity generated by the electrical production sources 110 to the loads 130 through the electric transmission, substation, and distribution equipment 120.

The loads 130 may refer to consumers, equipment, facilities, places, etc which consume electricity.

The station 500 may be one of the loads or a separate load connected to the system 100.

The station 500 may be connected to the system 100.

The station 500 may receive electricity from the system 100.

The station 500 may be a battery exchange station where the battery 210 of the means of transportation and the replacement battery 12 can be swapped.

The station 500 may be equipped with a plurality of swappable batteries 12 to replace a plurality of batteries of means of transportations.

The station 500 also may be a parking lot where the means of transportation 200 can be parked.

If the station 500 is a parking lot, the battery 210 of the means of transportation 200 and the replacement battery 12 can be swapped while the means of transportation 200 is parked.

The station 500 may be a battery exchange station that charges the battery 210 of the means of transportation 200 by providing electricity to the battery 210 of the means of transportation.

The station 500 may charge the battery 210 of the means of transportation by providing the electricity coming from the system 100 or the electricity stored in the batteries 10 to the battery 210 of the means of transportation 200.

The station 500 may be an electric power storage site where the electricity coming from the system 100 is stored.

The electric power storage site may refer to an Energy Storage System (ESS) which is connected to the system 100 and stores the electricity coming from the system 100.

The electric power storage site also may refer to a distribution substation which is connected to the system 100 and transforms and distributes the electricity coming from the system 100.

That is, the station 500 may function as a power relay.

If the station 500 functions as a power relay, electricity transactions between the system 100 and the means of transportation 200 may be made by charging and discharging the batteries 10.

The batteries 10 may be rechargeable batteries that can be charged and discharged.

As the batteries 10 consist of rechargeable batteries that can be charged and discharged, they may be charged with electricity coming from the system 100 and discharged to provide electricity to the battery 210 of the means of transportation 200.

A plurality of the large-capacity battery 11 may be provided.

The large-capacity battery 11 may be a battery used only for electric power storage which stores the electricity coming from the system 100.

The large-capacity battery 11 may be a battery capable of providing electricity to the system 100 and the battery 210 of the means of transportation 200.

The large-capacity battery 11 may be a battery that can be discharged for a long time when providing electricity to the system 100 and the battery 210 of the means of transportation.

The large-capacity battery 11 may be one of a Redox flow battery, a NaS (sodium-sulfur) battery, and a CAES system.

The large-capacity battery 11 may be a Redox flow battery which is charged and discharged by the oxidation and reduction of an electrolytic couple including at least one of the group consisting of vanadium (V), bromine (Br), zinc (Zn), cerium (Ce), and chromium (Cr).

The large-capacity battery 11 may be a NaS (sodium-sulfur) battery which creates a potential difference as sodium (Na) ions move through an electrolyte.

The large-capacity battery 11 may be a CAES system which produces electricity using compressed air.

A plurality of the replacement battery 12 may be provided.

The replacement battery 12 may be a battery that stores the electricity coming from the system 100 and is interchangeable with the battery 210 of the means of transportation 200.

The replacement battery 12 may be a battery that runs the means of transportation 200 and is capable of storing enough electricity to keep the means of transportation 200 running.

The replacement battery 12 may be a battery capable of providing electricity to the system 100 and the battery 210 of the means of transportation 200.

The replacement battery 12 may be a battery that can be discharged for a short time when providing electricity to the system 100 and the battery 210 of the means of transportation.

The replacement battery 12 may be one of a lithium-ion battery, a metal-air battery, and a Na-based battery.

The replacement battery 12 may be a lithium-ion battery which is charged and discharged by the movement of lithium ions.

The replacement battery 12 may be a metal-air battery which uses oxygen in the air as an active material.

The large-capacity battery 11 and the replacement battery 12 may be charged simultaneously by receiving electricity from the system 100.

The large-capacity battery 11 and the replacement battery 12 also may be charged sequentially by receiving electricity from the system 100.

For example, electricity may be provided first to the large-capacity battery 11 and then to the replacement battery 12 so that the replacement battery 12 is charged after completion of charging of the large-capacity battery 11 is charged. Alternatively, electricity may be provided first to the replacement battery 12 and then to the large-capacity battery 11 so that the large-capacity battery 11 is charged after completion of charging of the replacement battery 12.

The large-capacity battery 11 and the replacement battery 12 may be discharged simultaneously so that the electricity stored in them is provided to the system 100.

The large-capacity battery 11 and the replacement battery 12 also may be discharged sequentially so that the electricity stored in them is provided to the system 100.

For example, first the large-capacity battery 11 and then the replacement battery 12 may be discharged so that the replacement battery 12 is discharged after completion of discharging of the large-capacity battery 11. Alternatively, first the replacement battery 12 and then the large-capacity battery 11 may be discharged so that the large-capacity battery 11 is discharged after completion of discharging of the replacement battery 12.

The large-capacity battery 11 and the replacement battery 12 have a structure that can be replaced for maintenance and repair, and may be included in the station 500.

The large-capacity battery 11 and the replacement battery 12 may be controlled by the controller 20.

The large-capacity battery 11 and the replacement battery 12 may be charged with electricity coming from the system 100 and discharged by means of the controller 20.

The battery 210 of the means of transportation 200 may be interchangeable with the replacement battery 12.

The battery 210 of the means of transportation 200 and the replacement battery 12 may be swapped at the station 500.

That is, when the battery 210 of the means of transportation 200 and the replacement battery 12 are swapped, the replacement battery 12 that has been included in the station 500 is included in the means of transportation 200 and substitutes for the battery 210 of the means of transportation 200 and the battery 210 of the means of transportation is included in the station 500 and substitutes for the replacement battery 12.

The battery 210 of the means of transportation 200 may be swapped for the replacement battery 12 through an automatic battery exchanging device equipped in the station 500 or by manual replacement.

The battery 210 of the means of transportation 200 may be charged with electricity coming from the system 100 when swapped for the replacement battery 12.

That is, when the battery 210 of the means of transportation 200 and the replacement battery 12 are swapped and the battery 210 of the means of transportation 20 is included in the station 500, the battery 210 of the means of transportation substitutes for the replacement battery 12 and stores the electricity coming from the system 100.

Like the replacement battery 12, the battery 210 of the means of transportation 200 which has been swapped for the replacement battery 12 and included in the station 500 to substitute for the replacement battery 12 may be controlled by the controller 20.

Also, the battery 210 of the means of transportation 200 which has been swapped for the replacement battery 12 and included in the station 500 to substitute for the replacement battery 12 may be discharged to provide stored electricity to the system 100 or swapped for the battery of another means of transportation.

Also, the battery 210 of the means of transpiration 200 may be charged by receiving the electricity stored in the batteries 10.

That is, the battery 210 of the means of transportation 200 may be charged by receiving the electricity stored in the batteries 10, without being swapped for the replacement battery 12.

The electricity stored in the replacement battery 12 is preferentially provided to the battery 210 of the means of transportation 200. In a situation where it is difficult to charge the battery 210 of the means of transportation 200 with the electricity stored in the replacement battery 12, the electricity stored in the large-capacity battery 11 may be provided to the battery 210 of the means of transportation 200.

The supply of electricity to the battery 210 of the means of transportation 200 may be provided by controlling charging and discharging of the batteries 10 by the controller 20.

The battery 210 of the means of transportation 200 also may be charged with electricity coming from the system 100.

That is, the system 100, the means of transportation 200, and the station 500 are connected together to provide the electricity coming from the system 100 to the means of transportation 200 through the station 500 and charge the battery 210 of the transportation 200.

Also, the electricity stored in the battery 210 of the means of transportation 200 may be provided to the batteries 10 and the system 100.

That is, the system 100, the means of transportation 200, and the station 500 are connected together to provide the electricity stored in the battery 210 of the means of transportation to the batteries 10 and the system 100 through the station 500, thereby enabling the supply of electricity from the battery 210 of the means of transportation 200 to the system 100.

The battery 210 of the means of transportation 200 is charged with electricity coming from the batteries 10 or the system 100, and the electricity stored in the battery 210 of the means of transportation 200 is provided to the batteries 10 and the system 100, thereby enabling the bidirectional supply of electricity among the system 100, the means of transportation 200, and the station 500.

That is, the station 500 functions as a power relay, and electricity is coming from the means of transportation 200 to the station 500 and the system 100, thereby allowing for bidirectional electricity transactions between a consumer (means of transportation) and a supplier (system).

For example, if there is surplus electricity in the battery 210 of the means of transportation 200, the surplus electricity can be provided to the batteries 10 and the system 100. The surplus electricity provided to the batteries 10 and the system 100 can reduce electricity bills, or can be delivered back to the battery 210 of the means of transportation and used to charge the battery 210 later, thereby allowing for bidirectional electricity transactions.

The station 500 may further include an electric power converter 30 that converts the electricity stored in the batteries 10 and the electricity released from the batteries 10.

The electric power converter 30 may include a converter that converts AC power to DC power, an inverter that converts DC power to AC power, and a transformer that changes voltages from one voltage level to another.

The electricity stored in the batteries 10 may be electricity that is converted to DC by the converter.

The electricity released from the batteries 10 may be electricity that is converted to AC by the inverter.

The controller 20 may control charging and discharging of the batteries 10 according to the operation status of the system 100.

The operation status of the system 100 may be a status that depends on the load power of the system 100 or the provision or reception of electricity to or from the system 100.

For example, the operation status of the system 100 may indicate the stability of the supply of electricity to the system 100 depending on whether or not electricity generation and provision are taking place while the system 100 is keeping a certain amount of backup electricity (i.e., meets a predetermined amount), whether or not the electricity to be used by the load on the system 100 exceeds the possible supply, or whether or not the system is receiving electricity from an external power source such as the station 500.

That is, the controller 20 may control charging and discharging of the batteries 10 depending on whether the operation status of the system 100 is 'stable' or 'unstable'.

For example, if the operation status of the system 100 is 'stable' (e.g., a predetermined amount is met), the controller 20 may allow the batteries 10 to be charged with electricity coming from the system 100.

Alternatively, if the operation status of the system 100 is 'unstable' (e.g. the predetermined amount is not met), the controller 20 may allow the batteries 10 to provide the electricity stored in the batteries 10 to the system 100.

After determining the operation status of the system 100, the controller 20 allows the electricity stored in the batteries 10 to be provided to the system 100 if the load power of the system 100 is above a preset reference level, and allows the electricity coming from the system 100 to be stored in the batteries 10 if the load power of the system 100 is equal to or below the preset reference level. The preset reference level may vary with the possible supply of electricity from the system 100.

That is, if the load power to be used by the system 100 is above the possible supply of electricity from the system 100, the controller 20 may allow the batteries 10 to be discharged to provide the electricity stored in the batteries 10 to the system 100. If the load power to be used by the system 100 is equal to or below the possible supply of electricity from the system 100, the controller 20 may allow the batteries 10 to be charged with electricity coming from the system 100.

The preset reference level may be set according to the operation status of the system 100.

The preset reference level may be changed according to the electric generating capacity of the system 100 and the system's demand for electricity.

The controller 20 controls charging and discharging of the batteries 10 according to the preset reference level in such a way that the electricity stored in the batteries 10 is provided to the system 100 when the load power of the system 100 is large and the electricity coming from the system 100 is stored in the batteries 10 when the load power of the system 100 is small. In this way, the burden on the electricity supply through the system 100 can be reduced.

For example, if the load power of the system 100 is 100[MW], the possible supply of electricity from the system 100 is 120[MW], and the backup electricity the system 100 needs to keep is 30[MW], the maximum possible supply of electricity from the system 100 minus the backup electricity is 90[MW], which is 10[MW] less than the load power of the system 100. Therefore, providing 10[MW] of electricity from the batteries 10 to the system 100 makes it possible to meet the system's load power demand and maintain the backup electricity of the system 100, thereby reducing the burden on the electricity supply through the system 100.

After determining the operation status of the system 100, the controller 20 allows the electricity stored in the batteries 10 to be provided to the system 100 if the system 100 is at peak time during which the load power consumption of the system 100 is at its peak, and allows the electricity coming from the system 100 to be provided to the batteries 10 if the system 100 is at off-peak time.

The peak time may be set by dividing the time spent by the system 100 on consuming the load power into several periods and specifying a period during which the load power consumption of the system 100 is at its peak.

For example, a period when electricity is heavily used on a cyclical basis, such as [12:00-14:00] during which electricity is heavily used in summer or [20:00-22:00] during which electricity is heavily used in winter, may be set as the peak time.

The peak time setting may be changed monthly.

For example, the peak time may be set to [12:00-14:00] during the summer when the electricity use during the daytime is high due to air conditioner use and to [20:00-22:00] during the winter when the electricity use during the nighttime is high due to heater use.

With the peak time setting, the electricity supply through the system 100 may vary by hours.

For example, if the peak time is set to [12:00-14:00], the system 100 may run a peak-load power plant to supply the maximum amount of electricity between 12:00 and 14:00 or reduce the backup electricity to supply the maximum amount of electricity. On the other hand, during the off-peak time, the system 100 may stop the peak-load power plant from running or return the backup electricity to the previous state so that the electricity supply is maintained as it is before the peak time.

The peak-load power plant may refer to a plant which shuts down or perform other functions than meeting the system's load power demand during the off-peak time.

The peak-load power plant may be a source of renewable energy such as hydroelectric energy.

The peak-load power plant may operate during the peak time and provide electricity to the system 100 to meet peak-time demand.

After determining the operation status of the system 100, if the electricity supply through the system 100 is interrupted, the controller 20 may allow the electricity stored in the batteries 10 to be provided to the system 100.

Examples of interruptions of the electricity supply through the system 100 may include an interruption of electricity generation in the system 100 or an interruption of electricity transmission due to a failure of the system 100.

When the electricity supply through the system 100 is interrupted, the power consumption of a load which has been receiving electricity from the system 100 may be interrupted. If the load is such a load as a hospital, bank, data server, large-scale plant, or refrigeration facility, that requires non-interruptible power, the load may not operate properly due to the interruption of electricity supply, causing enormous damage. To avoid this, the controller 20 may allow the electricity stored in the batteries 10 to be provided to the system 100 when the electricity supply through the system 100 is interrupted, in order to maintain the electricity supply to the load.

That is, when the electricity supply through the system 100 is interrupted, the controller 20 allows the electricity stored in the batteries 10 to be provided to the system 100 in order to maintain the electricity supply to a load which has been receiving electricity from the system 100. Accordingly, the station 500 can perform the UPS function on the load on the system 100.

After determining the operation status of the system 100, if the electricity supply through the system 100 is a long-term electricity supply or heavy-duty electricity supply, the controller 20 may allow the electricity stored in the batteries 10 to be provided to the system 100.

The large-capacity battery 11 is a battery capable of long-term electricity supply or heavy-duty electricity supply to the system 100. If the operation status of the system 100 indicates that the system 100 requires a long-term or heavy-duty electricity supply, the controller 20 may allow the electricity stored in the large-capacity battery 11 to be provided to the system 100 to enable efficient and stable supply of electricity to the system 100.

After determining the operation status of the system 100, if the electricity supply through the system 100 is a short-term electricity supply or light-duty electricity supply, the controller 20 may allow the electricity stored in the replacement battery 12 to be provided to the system 100.

The replacement battery 12 is a battery capable of short-term electricity supply or light-duty electricity supply to the system 100. If the operation status of the system 100 indicates that the system 100 requires a short-term or light-duty electricity supply, the controller 20 may allow the electricity stored in the replacement battery 12 to be provided to the system 100 to enable efficient and stable supply of electricity to the system 100.

Figure 4:
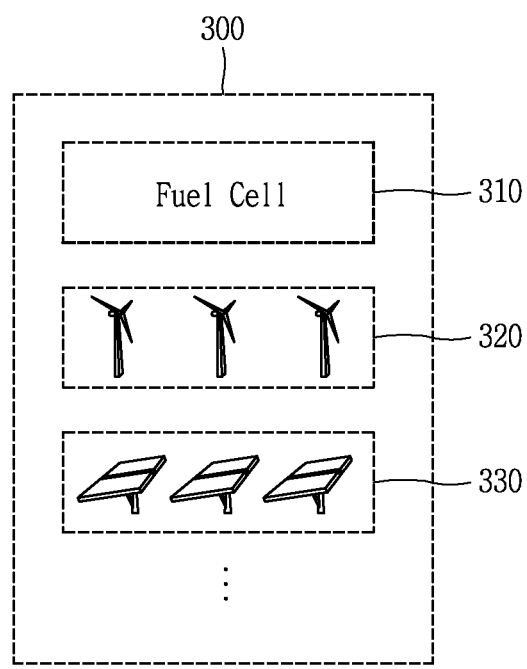
FIG. 4 illustrates the configuration of an embodiment of the battery exchange station disclosed in this specification.

As shown in FIG. 4, at least either the system 100 or the station 500 may include a renewable energy source 300 including at least a fuel-cell generator 310.

The fuel-cell generator 310 may refer to a generator that continuously produces electricity by a chemical reaction between hydrogen and oxygen.

The fuel-cell generator 310 may be constantly connected to the load to consume the continuously-produced electricity.

That is, the fuel-cell generator 310 may generate and consume electricity while connected to a load that consumes electricity.

The renewable energy source 300 may refer to an electrical production source that generates electricity by renewable energy other than fossil fuels through which the fuel-cell generator 310 generates electricity.

The renewable energy source 300 may be included in the system 100 and provide generated electricity to the load on the system 100 or the station 500.

The renewable energy source 300 also may be included in the station 500 and provide electricity to the batteries 10 or the system 100.

The renewable energy source 300 may be an electrical production source including at least either a wind power generator 320 or a solar power generator 330.

The wind power generator 320 may refer to an electrical production source that is powered by blades that are forced to rotate by wind.

The wind power generator 320 consists of at least one turbine, and may be disposed in the system 100 or the station 500 in a centralized or distributed manner.

The solar power generator 330 may refer to an electrical production source that generates electricity as photons put into a panel cause electrons to move.

The solar power generator 330 may consist of at least one PV (photovoltaic) module, and may be disposed in the system 100 or the station 500 in a centralized or distributed manner.

Electricity generation using the renewable energy source is highly affected by the weather, which makes it difficult to generate electricity on a steady and continuous basis, and the electricity generated by the renewable energy source undergoes significant variations in voltage and frequency, compared to the commercial power for the system 100, making it difficult to immediately provide electricity to the load on the system 100. To overcome this, the electricity generated by the renewable energy source 300 may be converted to DC, and the DC electricity may be converted to AC, i.e., the commercial power for the system 100, and provided to the system 100.

That is, the electricity generated by the renewable energy source 300 may be converted to DC to charge the batteries 10. Otherwise, the DC electricity may be converted to AC, i.e., the commercial power for the system 100 and provided to the system 100.

The fuel cell generator 310 may provide generated electricity to the load on the system 100. After determining the operation status of the system 100, if the electricity supply through the system 100 is interrupted, the controller 20 may connect the fuel-cell generator 310 to the batteries 10 to provide the electricity generated by the fuel-cell generator 310 to the batteries 10.

That is, in case of an interruption of electricity transmission due to a failure of the system 100 or if the fuel-cell generator 310 is not able to provide electricity to the load due to an abnormality in the load on the system 100, the controller 20 may connect the fuel-cell generator 310 to the batteries 10 so that the batteries 10 substitute for the load on the fuel-cell generator 310 and the fuel-cell generator 310 keeps generating electricity.

As shown in FIG. 3, the system 100 includes a central operation part 140 that controls the provision and reception of electricity to and from the system 100 and conducts communication with the controller 20. The controller 20 may control charging and discharging of the batteries 10 based on system operation information and a control instruction received from the central operation part 140.

The central operation part 140 may be a TOC (total operation center) that monitors and controls all the system 100's operations.

The central operation part 140 may monitor and control the provision and reception of electricity to and from the system 100.

The central operation part 140 may control the operation status of the system 100 according to the provision and reception of electricity to and from the system 100.

The central operation part 140 may collect information about the electricity provided to or received from the system 100, the means of transportation 200, and the station 500.

The central operation part 140 may control the operation of the system 100 and send a transaction request or transaction instruction to the station so as to allow for electricity transactions among the system 100, the means of transportation 200, and the station 500.

The central operation part 140 may monitor the operation status of the system 100 in real time and communicate with the controller 20 in real time.

The system operation information is information about the provision and reception of electricity to and from the system 100 that is collected by the central operation part 140, and the control instruction may be a control instruction regarding the reception or provision of electricity from or to the system 100.

For example, when there is surplus electricity due to a reduction in the load on the system 100, the central operation part 140 may monitor this situation and send to the controller 20 a control instruction regarding the reception of electricity from the system 100 to allow the station 500 to receive the surplus electricity from the system 100.

Alternatively, when the system requires backup electricity due to a load increase, the central operation part 140 may monitor this situation and send to the controller a control instruction regarding the supply of electricity to the system 100 to allow the station 500 to provide the backup electricity to the system 100.

Moreover, the controller 20 may inform the central operation part 140 of any electricity shortage in the batteries 10 through communication with the central operation part 140. Then, the central operation part 140 may send to the controller 20 a control instruction regarding the reception of electricity from the system 100 to allow the batteries 10 to be charged with electricity coming from the system 100 in response to the control instruction.

[Method of Operating Battery Exchange Station]

A method of operating a battery exchange station disclosed in this specification may be implemented by a portion or combination of the components or steps included in a battery exchange station according to this embodiment or other embodiments to be described below or by a combination of the embodiments. The technical terms used in this specification are merely used to describe specific embodiments of the present invention. Therefore, it should be understood that the terms used herein are not intended to limit the present invention.

Hereinafter, a method of operating a battery exchange station (hereinafter, operating method) disclosed in this specification will be described with reference to FIGS. 5 and 6.

FIG. 5 is a sequence diagram showing the steps of a method of operating a battery exchange station disclosed in this specification.

FIG. 6 is a flowchart showing the flow of the method of operating a battery exchange station disclosed in this specification.

As shown in FIG. 5, the method of operating a battery exchange station 500 where the battery of a means of transportation is swapped includes: the step S10 of charging a plurality of batteries with electricity coming from a system; and the step S20 of controlling charging and discharging of the batteries according to the operation status of the system that depends on the load power of the system or the provision or reception of electricity to or from the system.

The means of transportation may use the electricity stored in the battery.

The battery of the means of transportation may be swapped at the station.

The system may provide electricity to the station.

The system may refer to an electric power system including a plurality of electricity sources, electric transmission, substation, and distribution equipment, and multiple loads.

The station may be connected to the system and receive electricity from the system.

The station may be a battery exchange station where the battery of the means of transportation and the replacement battery can be swapped.

The station also may be a parking lot where the means of transportation can be parked.

The station may be a battery exchange station that charges the battery of the means of transportation by providing electricity to the battery of the means of transportation.

The station may charge the battery of the means of transportation by providing the electricity coming from the system or the electricity stored in the batteries to the battery of the means of transportation.

The station may be an electric power storage site where the electricity coming from the system is stored.

The station may function as a power relay.

If the station functions as a power relay, electricity transactions between the system and the means of transportation may be made by charging and discharging the batteries.

The batteries may be rechargeable batteries that can be charged and discharged, and include: a large-capacity battery used only for electric power storage; and a replacement battery that is interchangeable with the battery of the means of transportation.

The large-capacity battery may be a battery used only for electric power storage which stores the electricity coming from the system.

The large-capacity battery may be a battery capable of providing electricity to the system and the battery of the means of transportation.

The large-capacity battery may be any one of a Redox flow battery, a NaS (sodium-sulfur) battery, and a CAES system.

The large-capacity battery may be a Redox flow battery which is charged and discharged by the oxidation and reduction of an electrolytic couple including at least one of the group consisting of vanadium (V), bromine (Br), zinc (Zn), cerium (Ce), and chromium (Cr).

The large-capacity battery may be a NaS (sodium-sulfur) battery which creates a potential difference as sodium (Na) ions move through an electrolyte.

The large-capacity battery may be a CAES system which produces electricity using compressed air.

The replacement battery may be a battery that stores the electricity coming from the system and is interchangeable with the battery of the means of transportation.

The replacement battery may be a battery capable of providing electricity to the system and the battery of the means of transportation.

The replacement battery may be any one of a lithium-ion battery, a metal-air battery, and a Na-based battery.

The replacement battery may be a lithium-ion battery which is charged and discharged by the movement of lithium ions.

The replacement battery may be a metal-air battery which uses oxygen in the air as an active material.

In the step S10 of charging the batteries, the large-capacity battery and the replacement battery may be charged simultaneously by receiving electricity from the system.

In the step S10 of charging the batteries, the large-capacity battery and the replacement battery also may be charged sequentially by receiving electricity from the system.

In the step S20 of controlling charging and discharging of the batteries, the large-capacity battery and the replacement battery may be discharged simultaneously so that the electricity stored in them is provided to the system.

In the step S20 of controlling charging and discharging of the batteries, the large-capacity battery and the replacement battery also may be discharged sequentially so that the electricity stored in them is provided to the system.

The battery of the means of transportation may be interchangeable with the replacement battery.

The battery of the means of transportation and the replacement battery may be swapped at the station.

That is, when the battery of the means of transportation and the replacement battery are swapped, the replacement battery that has been included in the station is included in the means of transportation and substitutes for the battery of the means of transportation and the battery of the means of transportation is included in the station and substitutes for the replacement battery.

The battery of the means of transportation may be swapped for the replacement battery through an automatic battery exchanging device equipped in the station or by manual replacement.

The battery of the means of transportation may be charged with electricity coming from the system when swapped for the replacement battery.

Also, the battery of the means of transportation which has been swapped for the replacement battery and included in the station to substitute for the replacement battery may be discharged to provide stored electricity to the system or swapped for the battery of another means of transportation.

Also, the battery of the means of transpiration may be charged by receiving the electricity stored in the batteries.

The battery of the means of transportation also may be charged with electricity coming from the system.

That is, the system, the means of transportation, and the station are connected together to provide the electricity coming from the system to the means of transportation through the station and charge the battery of the transportation.

Also, the electricity stored in the battery of the means of transportation may be provided to the batteries and the system.

That is, the system, the means of transportation, and the station are connected together to provide the electricity stored in the battery of the means of transportation to the batteries and the system through the station, thereby enabling the supply of electricity from the battery of the means of transportation to the system.

The battery of the means of transportation is charged with electricity coming from the batteries or the system, and the electricity stored in the battery of the means of transportation is provided to the batteries and the system, thereby enabling the bidirectional supply of electricity among the system, the means of transportation, and the station.

In the step S20 of controlling charging and discharging of the batteries, the operation status of the system may be a status that depends on the load power of the system or the provision or reception of electricity to or from the system.

In the step S20 of controlling charging and discharging of the batteries, if the operation status of the system is 'stable', the batteries may be charged with electricity coming from the system.

In the step S20 of controlling charging and discharging of the batteries, if the operation status of the system is 'unstable', the electricity stored in the batteries may be provided to the system.

In the step S20 of controlling charging and discharging of the batteries, after the operation status of the system is determined, the electricity stored in the batteries may be provided to the system if the load power of the system is above a preset reference level, and the electricity coming from the system may be stored in the batteries if the load power of the system is equal to or below the preset reference level. The preset reference level may vary with the possible supply of electricity from the system.

That is, in the step S20 of controlling charging and discharging of the batteries, if the load power to be used by the system is above the possible supply of electricity from the system, the batteries may be discharged to provide the electricity stored in the batteries to the system. If the load power to be used by the system is equal to or below the possible supply of electricity from the system, the batteries may be charged with electricity coming from the system.

The preset reference level may be set according to the operation status of the system.

The preset reference level may be changed according to the electric generating capacity of the system and the system's demand for electricity.

In the step S20 of controlling charging and discharging of the batteries, after the operation status of the system is determined, the electricity stored in the batteries may be provided to the system if the system is at peak time during which the load power consumption of the system is at its peak, and the electricity coming from the system may be provided to the batteries if the system is at off-peak time.

The peak time may be set by dividing the time spent by the system on consuming the load power into several periods and specifying a period during which the load power consumption of the system is at its peak.

The peak time setting may be changed monthly.

With the peak time setting, the electricity supply through the system may vary by hours.

For example, if the peak time is set to [12:00-14:00], the system may run a peak-load power plant to supply the maximum amount of electricity between 12:00 and 14:00 or reduce the backup electricity to supply the maximum amount of electricity. On the other hand, during the off-peak time, the system may stop the peak-load power plant from running or return the backup electricity to the previous state so that the electricity supply is maintained as it is before the peak time.

The peak-load power plant may refer to a plant which shuts down or perform other functions than meeting the system's load power during the off-peak time.

In the step S20 of controlling charging and discharging of the batteries, after the operation status of the system is determined, if the electricity supply through the system is interrupted, the electricity stored in the batteries may be provided to the system.

Examples of interruptions of the electricity supply through the system may include an interruption of electricity generation in the system or an interruption of electricity transmission due to a failure of the system.

That is, in the step S20 of controlling charging and discharging of the batteries, when the electricity supply through the system is interrupted, the electricity stored in the batteries may be provided to the system in order to maintain the electricity supply to a load which has been receiving electricity from the system. Accordingly, the station can perform the UPS (uninterruptible power supply) function on the load on the system.

In the step S20 of controlling charging and discharging of the batteries, after the operation status of the system is determined, if the electricity supply through the system is a long-term electricity supply or heavy-duty electricity supply, the electricity stored in the batteries may be provided to the system.

In the step S20 of controlling charging and discharging of the batteries, after the operation status of the system is determined, if the electricity supply through the system is a short-term electricity supply or light-duty electricity supply, the electricity stored in the replacement battery may be provided to the system.

At least either the system or the station may include a renewable energy source including at least a fuel-cell generator.

The fuel-cell generator may refer to a generator that continuously produces electricity by a chemical reaction between hydrogen and oxygen.

The fuel-cell generator may be constantly connected to the load to consume the continuously-produced electricity.

That is, the fuel-cell generator may generate and consume electricity while connected to a load that consumes electricity.

The renewable energy source may refer to an electrical production source that generates electricity by renewable energy other than fossil fuels through which the fuel-cell generator generates electricity.

The renewable energy source may be an electrical production source including at least either a wind power generator or a solar power generator.

The wind power generator may refer to an electrical production source that is powered by blades that are forced to rotate by wind.

The solar power generator may refer to an electrical production source that generates electricity as photons put into a panel cause electrons to move.

Electricity generation using the renewable energy source is highly affected by the weather, which makes it difficult to generate electricity on a steady and continuous basis, and the electricity generated by the renewable energy source undergoes significant variations in voltage and frequency, compared to the commercial power for the system, making it difficult to immediately provide electricity to the load on the system. To overcome this, the electricity generated by the renewable energy source may be converted to DC, and the DC electricity may be converted to AC, i.e., the commercial power for the system, and provided to the system.

That is, the electricity generated by the renewable energy source may be converted to DC to charge the batteries. Otherwise, the DC electricity may be converted to AC, i.e., the commercial power for the system and provided to the system.

The fuel cell generator may provide generated electricity to the load on the system. In the step S20 of controlling charging and discharging of the batteries, after the operation status of the system is determined, if the electricity supply through the system is interrupted, the fuel-cell generator may be connected to the batteries to provide the electricity generated by the fuel-cell generator to the batteries.

That is, in the step S20 of controlling charging and discharging of the batteries, in case of an interruption of electricity transmission due to a failure of the system or if the fuel-cell generator is not able to provide electricity to the load due to an abnormality in the load on the system, the fuel-cell generator may be connected to the batteries so that the batteries substitute for the load on the fuel-cell generator and the fuel-cell generator keeps generating electricity.

FIG. 6 illustrates in detail the flow of the step S20 of controlling charging and discharging of the batteries. The flow chart represented in FIGS. 5 and 6 represent an executable program logic for the controller 20 and/or the central operation part 140 to perform control. The controller 20 and central operation part 140 each may include a CPU, ROM, RAM, memory, etc. to carry out the control.

According to step S210, the controller determines if the system 100 is operating during normal operation or abnormal operation, depending on whether a predetermined value is satisfied for at least one of the conditions discussed above. The operating status of the system may be determined by the central operation part, which provides the status to the controller. The station allows the batteries to be charged with electricity during normal operation of the system, and backs up the system and the load on the system (demand for electricity in the surrounding area) with the electricity stored in the batteries in case of an abnormality in the system. Thus, if the system is operating under normal operation, the process proceeds to step S220.

According to step S220, the controller 20 determines if peak load conditions are applicable. The peak load conditions may be determined by the central operation part 140, which provides the conditions information to the controller 20. During the peak time, that is, in the event of a peak load on the system, the system's peak load demand can be met using the electricity stored in the batteries. During the off-peak time, electricity coming from the system can be stored in the batteries. Thus, if the system is operating under peak load, the process proceeds to step S230. On the other hand, if the system is operating under off-peak load, the process proceeds to step S260, in order allow the system to use the system's electricity. Then the process proceeds to step S270, wherein the controller determines whether it is necessary to charge the battery, and charges the battery using the system's electricity if necessary.

In contrast, if the controller 20 determines in step S210 that the system is not operating under normal operation, i.e., there is an abnormality in the system according to the central operation part 140, the process proceeds to step S240 to allow backup of the system with the electricity stored in the battery(ies). Then the process proceeds to step S250 to determine whether it is necessary to backup demand for electricity in the surrounding area, and carry out backup as necessary using the stored electricity in the battery(ies).

The method of operating outlined in FIG. 6 may include the step A10 (FIG. 5) of controlling the provision and reception of electricity to and from the system and receiving system operation information and a control instruction from a central operation part that conducts communication with the station.

The step A10 of receiving system operation information and a control instruction may be included in any one of the steps (a), (b), and (c), as shown in FIG. 6.

If the step A10 of receiving system operation information and a control instruction is included in any one of the steps (a), (b), and (c) as shown in FIG. 6, charging and discharging of the batteries may be controlled based on the received system operation information and control instruction in the step S20 of controlling charging and discharging of the batteries, as outlined in FIG. 6 for example.

The central operation part may be a TOC (total operation center) that monitors and controls all the system's operations.

The central operation part may monitor and control the provision and reception of electricity to and from the system.

The central operation part may control the operation status of the system 100 according to the provision and reception of electricity to and from the system.

The central operation part may collect information about the electricity provided to or received from the system, the means of transportation, and the station.

The central operation part may monitor the operation status of the system 100 in real time and communicate with the station in real time.

The system operation information is information about the provision and reception of electricity to and from the system that is collected by the central operation part, and the control instruction may be a control instruction regarding the reception or provision of electricity from or to the system.

For example, when there is surplus electricity due to a reduction in the load on the system, the central operation part may monitor this situation and send to the station a control instruction regarding the reception of electricity from the system to allow the station to receive the surplus electricity from the system.

Alternatively, when the system requires backup electricity due to a load increase, the central operation part may monitor this situation and send to the station a control instruction regarding the supply of electricity to the system to allow the station to provide the backup electricity to the system.

Moreover, the station may inform the central operation part of any electricity shortage in the batteries through communication with the central operation part. Then, the central operation part may send to the station a control instruction regarding the reception of electricity from the system to allow the batteries to be charged with electricity coming from the system in response to the control instruction.

The foregoing embodiments of a battery exchange station and a method of operating the battery exchange station may be implemented individually or in combination.

The foregoing embodiments are only specific examples used to describe the battery exchange station and method of operating the battery exchange station disclosed in this specification. The embodiments may be applied and implemented in various ways other than the above-described examples.

The battery exchange station disclosed in this specification may be implemented using the method of operating the battery exchange station.

The battery exchange station disclosed in this specification may be applied and implemented for a battery charging station and a battery charging system.

The battery exchange station disclosed in this specification may be applied and implemented for an electric power storage site and an electric power storage system.

The method of operating the battery exchange station disclosed in this specification may be applied and implemented for a battery exchange station.

The method of operating the battery exchange station disclosed in this specification may be applied and implemented for a method of operating a battery charging station.

The method of operating the battery exchange station disclosed in this specification may be applied and implemented for a method of operating an electric power storage site.

The battery exchange station and method of operating the battery exchange station disclosed in this specification may be applied and implemented for a parking lot, where means of transportation can be parked, and a system for a parking lot.

The battery exchange station and method of operating the battery exchange station disclosed in this specification may be applied and implemented for a vehicle-to-grid (V2G) system, a battery exchange station in the V2G system, and a method of operating a battery exchange station.

The battery exchange station and method of operating the battery exchange station disclosed in this specification may be applied and implemented for an electricity agent for a smart grid, an electricity agent system, and a method of operating an electricity agent system.

The battery exchange station and method of operating the battery exchange station disclosed in this specification may be applied and implemented for an electricity exchange where bidirectional electricity transactions between electricity suppliers and electricity consumers take place, an electricity trading system, and a method of operating an electricity trading system.

The battery exchange station and method of operating the battery exchange station disclosed in this specification allow for utilization of electricity stored in a battery by charging the battery with electricity and delivering it back to a system.

The battery exchange station and method of operating the battery exchange station disclosed in this specification improve a system's operation and electricity demand conditions by providing the electricity stored in the battery to the system in case of any changes in the system's operation.

The battery exchange station and method of operating the battery exchange station disclosed in this specification enable the bidirectional supply of electricity between the station and a connected device or system by enabling electricity exchange among a system that provides electricity using a battery storing it, a means of transportation that is charged with electricity, and the station.

The battery exchange station and method of operating the battery exchange station disclosed in this specification make efficient use of excess electricity stored in the means of transportation charged with electricity by exchanging electricity between the means of transportation and the station.

The battery exchange station and method of operating the battery exchange station disclosed in this specification allow for bidirectional electricity transactions between suppliers and consumers by enabling the bidirectional supply of electricity between the station and a connected device or system.

The battery exchange station and method of operating the battery exchange station disclosed in this specification allow for a stable and flexible operation of the system by charging a battery with excess electricity, if there is any in the system, and providing the electricity stored in the battery to the system if there is no excess electricity.

The battery exchange station and method of operating the battery exchange station disclosed in this specification make efficient, effective, and flexible use of electricity generated by the system by charging a battery with excess electricity, if there is any in the system, and providing the electricity stored in the battery to the system if there is no excess electricity.

The battery exchange station and method of operating the battery exchange station disclosed in this specification enable uninterrupted power supply to a load by providing the electricity stored in the battery to the load on the system in case of an abnormality.

The battery exchange station and method of operating the battery exchange station disclosed in this specification keep renewable energy generation available by charging the battery with electricity generated by a renewable energy source in case of an abnormality.

The battery exchange station and method of operating the battery exchange station disclosed in this specification promote the utilization of renewable energy sources by storing electricity coming from a renewable energy source in the battery and providing it to the system and the load or charging the means of transportation with it.

What is claimed is:

1. A battery exchange station connected to an electric power system, the station comprising: a plurality of batteries including a large-capacity battery used only for electric power storage and a replacement battery that is interchangeable with a battery of a vehicle; and
   a controller programmed to control charging and discharging of the batteries, including controlling the station to charge the batteries with electricity supplied from the system and controlling the station to discharge the electricity stored in the batteries to the system based on an operation status of the system; and
   wherein, after determining the operation status of the system, the controller supplies the electricity stored in the batteries to the system if the system is operating at peak time during which the load power consumption of the system is at its peak, and supplies the electricity from the system to the batteries if the system is operating at off-peak time, wherein the peak time is set by dividing the time spent by the system on consuming the load power into several periods and specifying and period during which the load power consumption of the system is at its peak.

2. The battery exchange station of claim 1, wherein the battery of the vehicle is charged with electricity supplied from the system when the battery is swapped for the replacement battery.

3. The battery exchange station of claim 1, wherein the battery of the vehicle is charged by receiving the electricity stored in the batteries in the station.

4. The battery exchange station of claim 1, wherein the battery of the vehicle is charged with electricity supplied from the system, and the electricity stored in the battery of the vehicle is provided to the batteries in the station and the system.

5. The battery exchange station of claim 1, further comprising an electric power converter that converts the electricity stored in the batteries and the electricity released from the batteries,
the electric power converter comprising:
a converter that converts AC power to DC power;
an inverter that converts DC power to AC power; and
a transformer that changes voltages from one voltage level to another voltage level.

6. The battery exchange station of claim 1, wherein, after determining the operation status of the system, the controller supplies the electricity stored in the batteries to the system if the load power of the system is above a preset reference level, and supplies the electricity from the system to the batteries if the load power of the system is equal to or below the preset reference level,
wherein the preset reference level varies with the possible supply of electricity from the system.

7. The battery exchange station of claim 1, wherein, after determining the operation status of the system, if the electricity supply through the system is interrupted, the controller supplies the electricity stored in the batteries to the system.

8. The battery exchange station of claim 1, wherein, after determining the operation status of the system, if the electricity supply through the system requires a long-term electricity supply or heavy-duty electricity supply, the controller supplies the electricity stored in the batteries to the system, and if the electricity supply through the system requires a short-term electricity supply or light-duty electricity supply, the controller supplies the electricity stored in the replacement battery to the system.

9. The battery exchange station of claim 1, wherein the system comprises a central operation part that controls the provision and reception of electricity to and from the system and conducts communication with the controller, and the controller controls charging and discharging of the batteries based on system operation information and a control instruction received from the central operation part.

10. The battery exchange station of claim 9, wherein the central operation part monitors the operation status of the system in real time and communicates with the controller in real time.

11. The battery exchange station of claim 9, wherein the system operation information is information about the provision and reception of electricity to and from the system that is collected by the central operation part, and the control instruction is a control instruction regarding the reception or provision of electricity from or to the system.

12. A method of operating a battery exchange station connected to an electric power system, which are configured to supply electricity bidirectionally, the method comprising:
charging a plurality of batteries including a large-capacity battery used only for electric power storage and a replacement battery that is interchangeable with a battery of a vehicle with electricity supplied from the system; and
controlling charging and discharging of the batteries according to an operation status of the system that depends on a load power of the system or the provision and reception of electricity to or from the system; and
wherein, in the controlling charging and discharging of the batteries, after the operation status of the system is determined, the electricity stored in the batteries is provided to the system if the system is at peak time during which the load power consumption of the system is at its peak, and the electricity coming from the system is provided to the batteries if the system is at off-peak time, wherein the peak time is set by dividing the time spent by the system on consuming the load power into several periods and specifying a period during which the load power consumption of the system is at its peak.

13. The method of claim 12, wherein the battery of the vehicle is swappable for the replacement battery and charged with electricity coming from the system when swapped for the replacement battery, and the battery of the vehicle is charged by receiving the electricity stored in the large-capacity battery and the replacement battery.

14. The method of claim 12, wherein, in the controlling charging and discharging of the batteries, after the operation status of the system is determined, the electricity stored in the batteries is provided to the system if the load power of the system is above a preset reference level, and the electricity coming from the system is stored in the batteries if the load power of the system is equal to or below the preset reference level,
wherein the preset reference level varies with the possible supply of electricity from the system.

15. The method of claim 12, wherein, in the controlling charging and discharging of the batteries, after the operation status of the system is determined, if the electricity supply through the system is interrupted, the electricity stored in the batteries is provided to the system.

16. The method of claim 12, further comprising controlling the provision and reception of electricity to and from the system and receiving system operation information and a control instruction from a central operation part that conducts communication with the station,
wherein, in the controlling charging and discharging of the batteries, charging and discharging of the batteries are controlled based on the received system operation information and control instruction from the central operation part.

17. The method of claim 16, wherein the central operation part monitors the operation status of the system in real time and communicates with the station in real time.

18. The method of claim 16, wherein the system operation information is information about the provision and reception of electricity to and from the system that is collected by the central operation part, and the control instruction is a control instruction regarding the reception or provision of electricity from or to the system.

* * * * *